US008058776B1

(12) United States Patent
Gibson et al.

(10) Patent No.: US 8,058,776 B1
(45) Date of Patent: Nov. 15, 2011

(54) LAMINAR ARRAY ULTRASOUND TRANSDUCER AND SYSTEM

(76) Inventors: William Gordon Gibson, Edmonton (CA); Curtis M. Figley, Edmonton (CA); Darin Hunt, Edmonton (CA)

( * ) Notice: Subject to any disclaimer, the term of this patent is extended or adjusted under 35 U.S.C. 154(b) by 628 days.

(21) Appl. No.: 12/081,508

(22) Filed: Apr. 17, 2008

Related U.S. Application Data

(63) Continuation-in-part of application No. 11/984,859, filed on Nov. 23, 2007, now Pat. No. 7,791,254.

(60) Provisional application No. 60/912,855, filed on Apr. 19, 2007, provisional application No. 60/861,011, filed on Nov. 27, 2006.

(51) Int. Cl.
*H01L 41/08* (2006.01)

(52) U.S. Cl. .................. 310/336; 310/334; 310/335

(58) Field of Classification Search .............. 310/334, 310/335, 328, 327, 336, 325; 73/626; *H01L 41/08*
See application file for complete search history.

(56) References Cited

U.S. PATENT DOCUMENTS

| | | | | |
|---|---|---|---|---|
| 4,450,606 A | * | 5/1984 | Broussard | 188/67 |
| 4,550,606 A | * | 11/1985 | Drost | 73/626 |
| 4,583,018 A | * | 4/1986 | Izumi et al. | 310/334 |
| 6,396,199 B1 | * | 5/2002 | Douglas et al. | 310/335 |
| 6,489,706 B2 | | 12/2002 | Sliwa, Jr. et al. | |
| 6,915,696 B2 | | 7/2005 | Dufait et al. | |
| 7,791,252 B2 | * | 9/2010 | Baumgartner et al. | 310/334 |

* cited by examiner

*Primary Examiner* — Thomas Dougherty
*Assistant Examiner* — Karen B Addison
(74) *Attorney, Agent, or Firm* — The Marbury Law Group, PLLC

(57) ABSTRACT

A system for use in material testing which can be used on non-planar shapes and which is simple and inexpensive in construction. The system includes a layer of piezoelectric material sandwiched between and connected to a unified electrode and a plurality of excitable electrodes; and a structure, such as a Faraday structure-like unit which prevents electric or static fields from getting into or out of the structure and controls voltage potentials contained therein to be uniform, enclosing the ultrasonic transducer unit, and functions by maintaining a voltage potential on the electrodes and the piezoelectric material then pulling to the reference potential selected electrodes to generate a signal which excites the piezoelectric material so it generates a corresponding signal and then measuring the return signal generated by the piezoelectric material in response to a return signal from material being tested in response to the signal generated by the piezoelectric material. The signal generation process can be viewed as being reversed from the process used in the prior art in that the initial signal is generated by the unit of the present invention by pulling an electrode to the reference potential rather than by applying a high voltage pulse to the electrode.

20 Claims, 12 Drawing Sheets

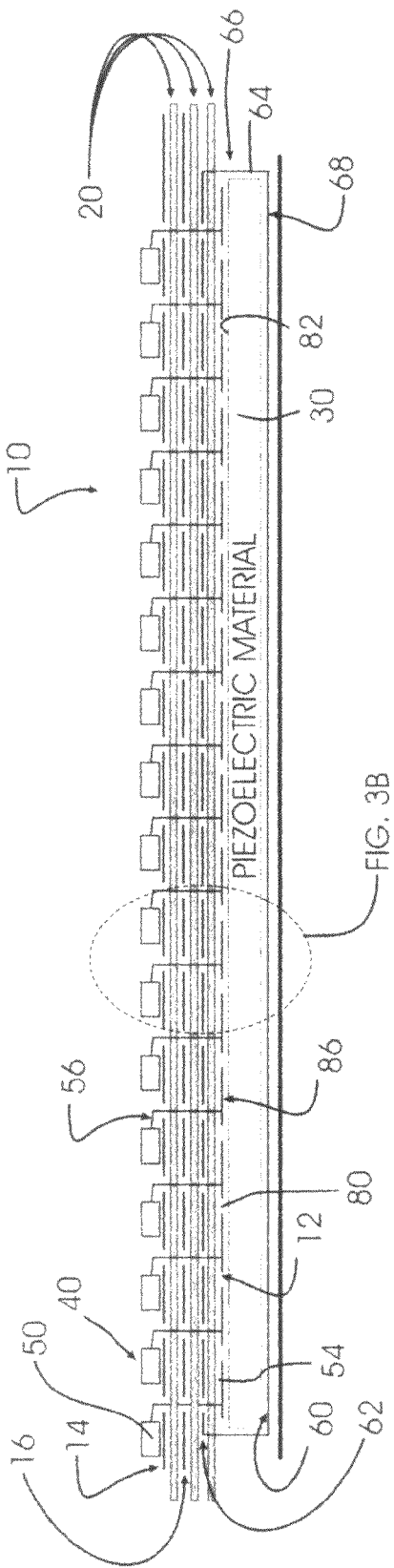
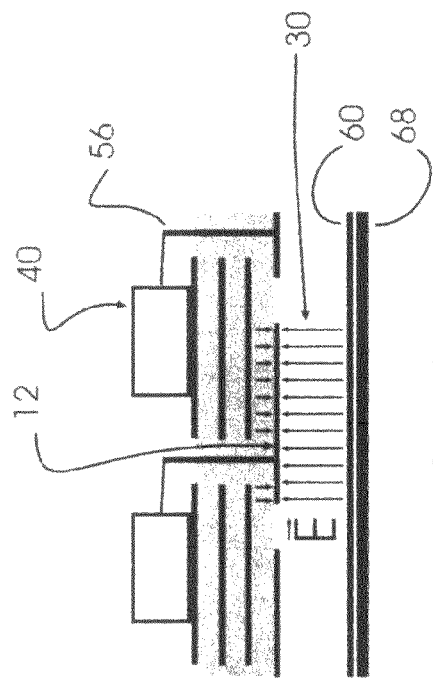
FIGURE 3A
FIGURE 3B

LAMINAR ARRAY ULTRASOUND TRANSDUCER AND SYSTEM

CROSS REFERENCE TO RELATED APPLICATIONS

This application claims priority to U.S. Provisional Application No. 60/912,855 titled "Laminar Array Ultrasound Transducer and System" filed 19 Apr. 2007 and is a continuation-in-part application of U.S. patent application Ser. No. 11/984,859, titled "Hybrid Ultrasound Transducer", filed on Nov. 23, 2007 by the same inventors and which is pending on the filing date of the instant application, and which claims a priority date of Provisional Patent Application Ser. No. 60/861,011 titled "Hybrid Ultrasound Transducer", filed on Nov. 27, 2006. The disclosures of each of these documents are fully incorporated herein by reference.

FIELD OF THE INVENTION

The present invention relates in general to the field of measuring and testing, and in particular to transducers.

BACKGROUND OF THE INVENTION

Transducers are defined as devices that convert energy from one form to another. Non-destructive testing (NDT) often uses special transducers to interrogate the internal structure and features of materials or devices under test (DUT) that can not be directly observed by ordinary means. In many instances the structures or features embedded in the materials are undesirable and are considered flaws or damage. In other instances the internal structures and features are an expected, allowable or necessary component of the material. In either case, obtaining accurate information about the nature and character of these internal structures and features is a fundamental need during the inspection, qualification and diagnosis of these materials. One common transducer in NDT applications is the ultrasound transducer (UT).

In the case of a UT, sound energy is converted to electrical energy or electrical energy is converted to sound energy. In many cases this energy conversion is done through the piezoelectric effect, where an electrical field or potential in a piezoelectric material induces a mechanical strain generating an acoustic field, or conversely, an acoustic field impinging on the piezoelectric material induces an electric field or potential. These piezoelectric materials normally have complex electrical impedances which require special methods to integrate them into useful transducers.

Ultrasound is defined as sound whose frequency is above the threshold of hearing (that is, greater than 20 kHz). For practical purposes, signals greater than 100 kHz are typically used. Frequency, along with excitation time width, defines the spatial resolution of the interrogating sound field. A short, high frequency pulse will enable small anomalies and defects in material to be detected. However, with an increase in frequency comes an increase in the attenuation through scattering and absorption of the sound energy. This limits the effective depth that can be probed without too great a loss in signal energy. Consequently, there is an optimal frequency range that trades resolution with received signal response. For ultrasound NDT, a frequency range between 2 and 20 MHz is optimal, with the lower range being most common.

A conventional NDT system configuration is shown in FIG. 1. In this figure the ultrasound system B is connected to a UT C via a long coaxial cable D. UT C includes piezoelectric material BP and an impedance matching and tuning network BI which operate and function in known manners. The ultrasound system produces a high voltage excitation signal which propagates down the coaxial cable, is applied to the piezoelectric element (which includes the piezoelectric material and optional tuning components) and generates an acoustic signal from the front of the UT. Received acoustic signals are sensed by the UT and converted to electrical signals, which are sent back down the coaxial cable to the ultrasound system for analysis. These received signals are generated due to an acoustic impedance mismatch in the material being interrogated. When the acoustic wave in the material impinges upon a change in material property (a change in either density or speed of sound which gives rise to a change in acoustic impedance), part of the acoustic wave is reflected, and another part is transmitted through. This reflected wave is what is received by the transducer. The location of either the far wall of the material or an internal crack or void is measured by the transit time for the wave to travel forward and then be reflected back. Corrosion shows up as a change in distance or transit time from the transducer to the far wall as compared with un-corroded sections.

A useful measure of the ability of a system to convey information from a transducer to a measurement or detection unit is the Signal-to-Noise Ratio (SNR). This parameter relates the signal, in whatever dimensions and units are appropriate, to the noise that is present and that would be detected simultaneously with the signal. High SNR values indicate that the signal stands out clearly against the background noise, whereas low SNR values indicate that the signal is being obscured by the noise.

High noise environments, long interconnections, lossy matching networks and low signal levels generally combine to degrade the SNR and confound the detection of small, deep or poorly defined structures or features in the material under interrogation.

Single crystal transducers limit the interrogation of material to the volume under the crystal. Consequently, to inspect more volume of the DUT, the transducer has to be moved. Movement of the transducer by the operator introduces the potential of operator error. Automated Ultrasound Testing systems (AUT) use robotics to move the transducer to remove the potential of operator error. However, these systems can be costly and are time consuming to set up.

Recently, NDT ultrasound systems have incorporated linear array transducers. A linear array transducer consists of a line of single rectangular piezoelectric elements closely spaced side by side. The height of each element is typically 1.5 times the width, and the inter-element spacing is on the order of half a wavelength. A typical linear array transducer will have 16, 64 or 128 such elements in a row. As known to those trained in the art, the geometry of the elements defines the electro-acoustic and geometric response of the transducer array. The thickness and type of piezoelectric material, along with the material loading the back and front sides of the piezoelectric material defines the frequency of operation of the transducer. The size and spacing of the elements defines the geometric response of the transducer as it is used in either single element, or multiple element operation. The ultrasound system or phased array system can pulse and sense single elements in a raster scan (see FIG. 2a) with the pulses to the various elements spaced relatively far apart in time from the pulses to other elements so that the acoustic waves from various elements do not superimpose.

Alternately, the elements can be pulsed either simultaneously or sequentially, introducing various delays between elements. FIG. 2b shows an example where the array elements are pulsed sequentially with small delays between the pulses to the various elements. This effectively steers the acoustic beam. By appropriate timing and control of the various elements in the array (establishing each as a "receive only", "transmit only" or "receive-transmit" combination as described elsewhere in this application) in conjunction with the overall timing organization of the high voltage and receiver gating, phased array operation can be achieved on both transmitted and received acoustic signals.

A linear array system effectively increases the volume of material that can be inspected by sweeping the beam throughout a range of angles in one dimension or stepping the active elements along the direction of the array without the need to move the transducer, thereby reducing the potential of operator errors. The transducer still must be moved in the direction perpendicular to the angle of beam steering to gather more volume information from the DUT in two dimensions. In this configuration, an encoder is used to measure the amount of motion, so that as the transducer is moved, the area under it is appropriately mapped by the phased array system. Phased array systems are typically 5 to 10 times more costly than a single element system, and the transducers are more expensive with more complex connectors and cabling due to the increased number of wires required to access all the elements.

Two-dimensional transducer array systems are also available and provide the greatest volume of inspection without the need to move the transducer. However, the complexity and cost of these systems have made their use prohibitive in NDT. They are primarily used in certain medical applications, providing three-dimensional imaging. As with the linear array, the 2D array has an even more complex connector and cabling systems due to the increased number of elements. In the linear or 2D array, although a common, large area front electrode is typically used, the back electrode of each cell is typically tied directly to a wire, so that the number of wires leaving the transducer are equal to the number of elements plus one for the reference wire. Transducer size is also limited when interrogating curved surfaces because the transducers are inflexible. As a result they are unable to make contact over large areas of curved surfaces.

There is a need for a two-dimensional array transducer system that can provide a large volume of interrogation without the need for an operator to move the transducer. There is also a need to have this transducer flexible so that it bends over a curved surface. There is also a need to integrate the excitation and receive functions of the ultrasound system to reduce the need for extensive cabling. The objective of this invention is to achieve all of these goals while reducing or avoiding the undesirable effects identified herein.

DESCRIPTION OF THE RELATED ART

The disclosures of all the following publications are incorporated by reference into this application.

Kojima in 1986 is the first to describe a flexible matrix array transducer (FMAT) for use in NDT (Kojima, T., Ultrasonics Symposium, IEEE, 1986). His system utilizes piezoelectric ceramic elements diced and embedded in a silicon matrix. He developed a 2.25 MHz, 256 element array flexible to fit a sphere with a 100 mm radius. The second transducer operated at 3 MHz with 1024 elements, and was cylindrically flexible to a radius of 20 mm. Issues of wiring and interconnections were identified as a problem. Cost issues were not addressed, as this was a research endeavor. Given that piezoelectric ceramic crystals were used, and these are expensive, this arrangement is expected to be expensive.

Applications of 2D arrays resurfaced in 1992. Turnbull and Foster (IEEE Transactions of Ultrasonics, Ferroelectrics and Frequency Control, Vol 39, No. 4, July 1992) investigated the excitation and cross coupling of energy between 100 micrometer square PZT elements embedded in epoxy. Only one element was excited at a time while sensing neighbouring elements and the complexities of wiring up a complete array were not addressed. Smith et. al. (Ultrasonic Imaging, 14(3): 213-233 July 1992) described a two-dimensional array for medical imaging. The objective of their 2D array was to improve the imaging and focus in the elevation plain as compared to a linear array. They described two systems: the first system utilized a small rigid array (4 by 32 elements) operating at 2.8 MHz, and; the second was two 16 by 16 arrays, the first operating at 1 MHz and the second at 2.3 MHz. Cabling and interconnection was still identified as a problem, hence the reason for the limited number of elements.

More recently, micro machined ultrasonic transducers have been described (see for example Eccardt, et. al., U.S. Pat. No. 6,320,239, November 2001) which facilitates the integration of electronics within the ultrasonic transducer. These transducers have also been arranged in a 2D array format to achieve 3D imaging (see for example Carson et. al., U.S. Pat. No. 5,406,163, April 2005 or Erikson et.al., U.S. Pat. No. 6,589,180, July 2003). The ability to integrate electronics within the transducer now effectively eliminates wiring issues. However, the sensitivity and effectiveness of micromachine ultrasonic transducers have yet to be proven, as they are air coupled which limits the amount of signal energy introduced and received from the material under investigation.

OBJECTS OF THE INVENTION

It is an object of this invention to generate a 2D array of elements in a thin layer that provides a flexible surface that can comply with curved shapes.

It is a further object of this invention to integrate pulsing and sensing circuitry into the flexible transducer to eliminate cabling. There is also a need to reduce the complexity of the interconnection wiring as compared to the case of individually driven and monitored sensor elements typical in conventional 2-D arrays.

It is an object of this invention to control the transducer digitally, and receive the acoustic signals digitally via an interface controller.

It is yet a further object of this invention to be "drop in" compatible with conventional phased array ultrasound systems such that the invention can easily replace existing phased array transducers without requiring phased array ultrasound system modifications.

It is another object of this invention to interface with existing linear phased array systems by simulating the 1-D scanning encoder output along with simultaneously exciting various appropriate linear regions of the 2-D array, so as to emulate the apparent travel motion of the 1-D linear array It is an object of this invention to reduce the effort, difficulty and complexity of manipulating a ultrasound transducer to survey a volume being interrogated.

It is an object of this invention to simplify periodic re-inspection of a material or object to detect slow changes in the material.

It is an object of this invention to allow continuous inspection of a material or object to detect rapid changes in the material.

It is an object of this invention to accurately reproduce the viewing geometry between inspections, including the character and dimensions of any coupling layers that match the ultrasound transducer to the material, so that small changes in the underlying structures can be detected.

It is an object of this invention to provide a high number of densely spaced sensors to reduce the need for accurately placing a particular sensor at a particular position. It is an object of this invention to provide a mechanism and process to perform ultrasonic material inspections when the material is operating in dangerous or difficult access areas.

It is an object of this invention to provide equivalent performance and functionality to automatic scanning ultrasound systems to reduce the dependency on mechanical motion systems.

The objective of this invention is to achieve all of these goals while reducing or avoiding the undesirable effects identified herein.

SUMMARY OF THE INVENTION

These; and other, objects are achieved by a system for use in material testing which can be used on non-planar shapes and which is simple and inexpensive in construction. However, other similar ultrasonic measurement applications can also make effective use of this invention. Broadly, the principles of the present invention are embodied in a device for ultrasonic measurement applications comprising: an ultrasonic transducer unit that includes a layer of piezoelectric material sandwiched between and connected to a unified electrode and a plurality of excitable electrodes; and a structure, such as a Faraday structure-like unit, that prevents electric or static fields from getting into or out of the structure and controls voltage potentials contained therein to be uniform, enclosing the ultrasonic transducer unit, the device functioning by maintaining a voltage potential on the electrodes and the piezoelectric material then pulling to the reference potential selected electrodes to generate a signal that excites the piezoelectric material so that it generates a corresponding acoustic signal and then measuring the return signal generated by the piezoelectric material in response to a return acoustic signal from the material being tested, the return acoustic signal being in response to the acoustic signal generated by the piezoelectric material. The signal generation process can be viewed as being reversed from the process used in the prior art in that the initial signal is generated by the unit of the present invention by pulling an electrode to the reference potential rather than by applying a high voltage pulse to the electrode. The term reference, reference potential or similar concepts are used throughout the text and are typically the device ground potential. However, this is not always the case and other reference potentials can be accommodated by this invention.

A two-dimensional array of ultrasonic transducer elements is constructed by placing a layer of piezoelectric material between a large unified electrode on the face of the assembly and an array of individually or jointly excitable small electrodes on the back of the piezoelectric material. The layer of piezoelectric material may consist of a continuous sheet of flexible piezoelectric material or may be a matrix of small, relatively rigid piezoelectric elements that are suspend in a flexible arrangement. The cell electrodes, excitation circuitry and received signal conditioning (preamplifier) are constructed using conventional and modified printed circuit board fabrication techniques to provide durable, flexible, large area array transducers with relatively large spatial sampling. Another possible construction method is to use thin film and micro electronic fabrication methods. This may include, for example chemical vapor, or vacuum deposition of metal and piezoelectric layers onto a substrate that was prepared with microelectronics using thin film deposition and etching techniques.

It is to be understood that while the preferred form of the device is disclosed herein as including physical structures that combine to define a Faraday structure, based on the teaching of this disclosure, those skilled in the art of electronics and material sciences may devise special materials or combinations of materials and electronics to define a structure that satisfies the requirements of this invention while still falling within the scope of this disclosure. The testing can be ultrasonic material testing or nondestructive ultrasonic material testing or the like.

The high voltage pulse excitation can be generated locally at each array element without complex circuitry, which simplifies excitation signal distribution and the attendant issues of cabling and impedance matching.

The problem associated with complex cabling can be visualized as a problem of having N+1 wires, where N is the number of elements in the array and is solved by the unit embodying the principles of the present invention having integrated electronics and direct addressing of each cell and using a Faraday structure whereby the activation of cells is reversed from prior art methods as will be understood from the teaching of this disclosure. This leaves the number of wires required to 4—one for reference, one for power, one for data and one for addressing/communication. It is also possible to use only 2 wires by multiplexing the data and communication together on the power wires.

The excitation signals, optionally generated by the simple act of electrically selecting the transducer elements, are converted into acoustic pulses by the piezoelectric material and radiate out into the material sample as an acoustic wave pattern.

Returning acoustic reflections are converted into electrical signals by the piezoelectric element, although at a much lower amplitude than the original exciting signal. The received signals, once converted back to an electrical form, are routed to a preamplifier and conditioned to a suitable form for either local analysis or for transmission to a remote analysis system.

BRIEF DESCRIPTION OF THE DRAWINGS

FIG. 3a shows an embodiment of the physical configuration of the disclosed laminar array configuration.

FIG. 3b shows an expanded view of a single array cell formed from the embodiment shown in 3a, wherein the structure has been compressed together as intended and an electric field is present.

DETAILED DESCRIPTION OF THE PRESENTLY PREFERRED EMBODIMENT

Figure 1:
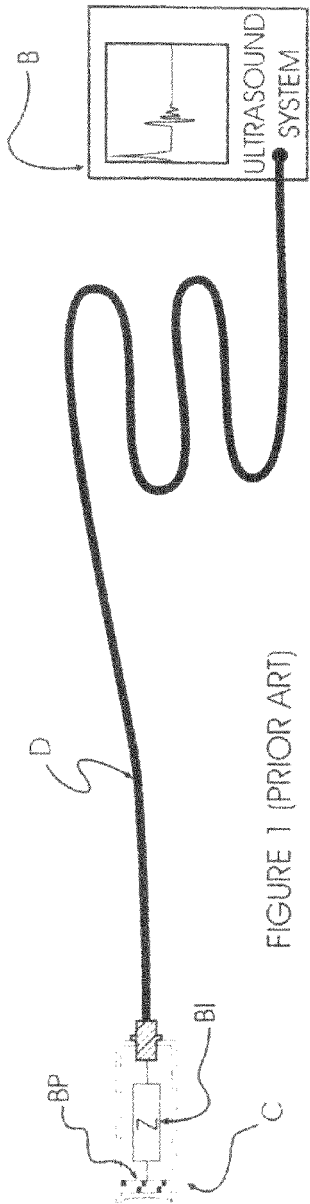
FIG. 1 shows a conceptual block diagram of a typical conventional NDT ultrasound system configured with a long coaxial cable and a single element ultrasound transducer.
Figure 2A:
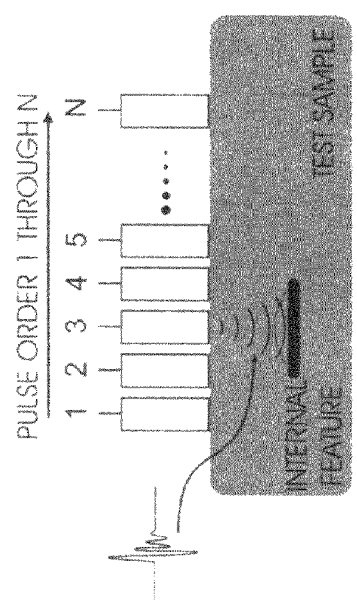
FIG. 2a shows a conceptual block diagram of a linear phased array system operating in a raster scan mode.
Figure 2B:
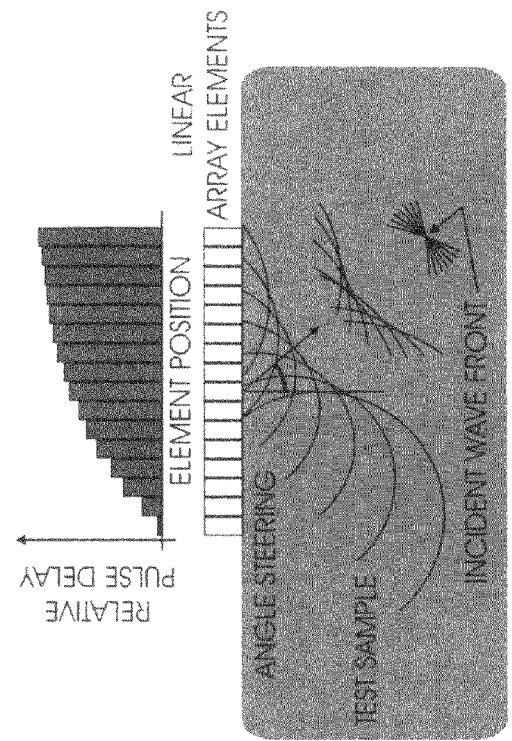
FIG. 2b shows a conceptual block diagram of a linear phased array system operating in a beam steering mode.

Other objects, features and advantages of the invention will become apparent from a consideration of the following detailed description and accompanying drawings. It is intended that the following detailed descriptions be understood to be illustrations of the various preferred embodiments of the invention and not as a definition of the invention.

The current discussion makes reference to positive going high voltage. However, it should be understood that complementary and consistent system designs based on the concepts in this invention are possible using negative polarity. Polarities and other related features of the underlying components can be selected to make these analogous situations practicable. No limitation of the invention based upon a positive or negative polarity is implied in this discussion.

The current discussion also makes reference to cells or arrays of cells. There are many possible shapes and configurations possible, including the regular rectangular arrays shown as examples herein. However, there are many other regular and irregular arrangements and shapes such as radial and annular circular arrays, hexagonal or other higher order symmetry arrays, random arrays as well as many possible cell electrode shapes that may or may not provide high packing ratios or may or may not cover the underlying surfaces to a large extent. These other arrangements may have benefits in certain situations where the shape and arrangement of the electrodes can be used to form special beam profiles. No limitation of this invention based upon the simple rectangular arrangement is implied in this discussion.

FIG. 3a shows unit 10 which embodies one aspect of a preferred embodiment of this invention. This figure shows an exploded view of the key cross sectional details of the laminar structure described herein. In this embodiment, the ultrasonic transducer cell array 12 is formed as a planar structure much like a conventional printed wiring board. Each of the various active, passive and interconnection layers such as top signal layer 14, inner signal layer 16 insulating PCB layers 20, are used to convey or direct signals to produce electric fields in piezoelectric material 30 at the appropriate times or alternately to convey or direct signals generated by piezoelectric material 30 to signal measurement circuits 40. The signal measurement circuits include electronic components 50, each of which is connected to an associated cell electrode 54 by a lead 56 which extends through the layers as shown in FIGS. 3a and 3b. As is also shown in these figures, unit 10 further includes a front electrode 60 electrically connected to a Faraday electrode layer 62 by elements 64, with elements 60, 62 and 64 defining a Faraday structure 66. Layer 30 of piezoelectric material is located inside Faraday structure 66 and top signal layer 14 is located outside the Faraday structure. An acoustic face 68 is also located outside Faraday structure 66. If the overall construction of the layered assembly is relatively thin and flexible, then the assembly can be easily shaped so that it mates effectively with the items and materials being tested even when the tested materials are non-planar in shape and/or configuration.

Figure 3C:
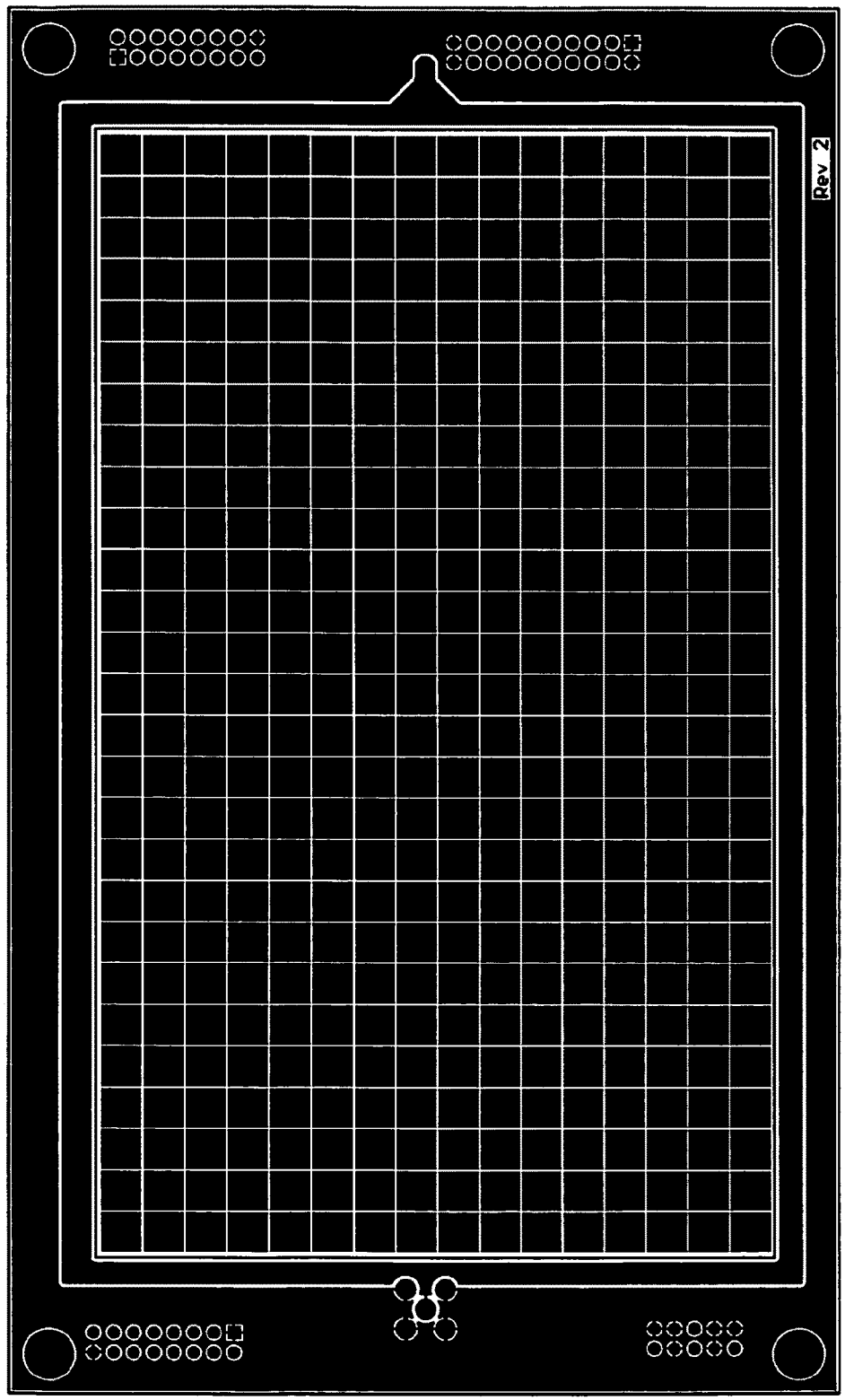
FIG. 3c shows a typical pattern used to create an array of cell electrodes, in this instance as a layer of a laminated printed circuit structure.

More specifically, the embodiment shown in FIG. 3a consists of several thin layers of conventional printed circuit material 20 to which layer 30 of piezoelectric material has been bonded. The metalized printed circuit board layer immediately adjacent to internal side 82 of the piezoelectric material has an array pattern 86 of electrodes 54. Each individual electrode either defines an active cell or acts as an electric field shaping guard, depending on the electric potential of the electrode. An example of the electrode pattern is shown as FIG. 3c. The piezoelectric material layer is intimately bonded to this surface. It is noted that one form of the unit will have a unitary piezoelectric layer; however, the piezoelectric material need not be in the form of a one-piece or unitary structure. Furthermore, as those skilled in the art will understand, even though there are a plurality of electrodes and a single piezoelectric material layer, there will not be any significant level or cross talk between adjacent electrodes due to the geometry and design of the unit. The spacing between adjacent electrodes is adjusted with respect to the thickness of the piezoelectric material so that crosstalk is minimized, if not eliminated.

Figure 3D:
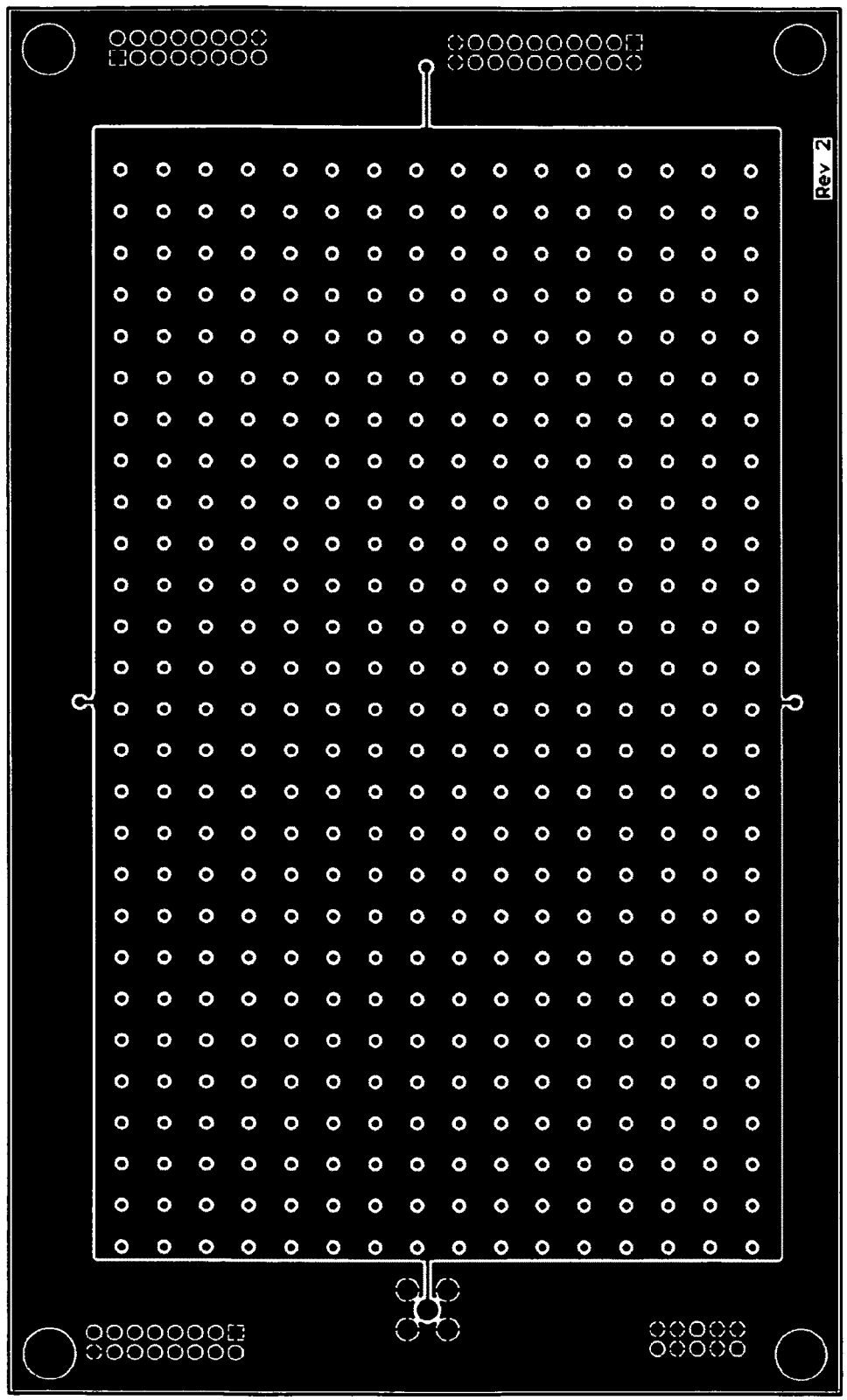
FIG. 3d shows a view of a typical internal Faraday layer used in the printed circuit board structure. This layer is positioned immediately adjacent to the layer shown in FIG. 3c, but on the internal side of the laminated structure.

A conductive layer on the outside facing side of the piezoelectric material forms a common electrode 60 for all the cells. This outermost conductive layer is in electrical contact with a plane 62 within the printed circuit board structure residing one layer deeper than the layer containing the individual cell electrodes (an example pattern of this plane is shown in FIG. 3d). This plane is substantially complete, with only small periodic apertures to allow the connections to the cell electrodes to pass through.

Note that although this discussion makes references to using conventional printed circuit board materials and techniques for creating the laminar structure supporting and driving the piezoelectric material, other materials providing similar mechanical and electrical characteristics could be used. For example, there are many possible plastics and fibre composites that could be used either as insulating layers or in some cases as conductive members as is the case with conductive plastics. As well, the construction does not necessitate require using metalization layers that are directly bonded to non-conductive substrates. As a result, there are many other possible construction techniques possible which would allow the formation of a thin, flexible, laminar assembly with the requisite electronic connections between the piezoelectric material and the various supporting electronic components. No limitation should be taken in the scope of the invention by this discussion's focus on printed circuit board techniques and materials as other methods and materials are also suitable for realizing this invention as a practical device. It is noted that the methods of construction proposed and disclosed herein are only examples and are not intended to limit the scope of the claims attached hereto. Those skilled in the art will understand that there are other methods which can be used based on the teaching of this disclosure. Such other methods and structure is intended to be within the scope of this disclosure and claims.

The outside conductive layer and the internal, substantially complete, layer that is in electrical contact with it via elements 64 form Faraday cage structure 66 around the piezoelectric material and the individual cell electrodes.

Figure 4A:
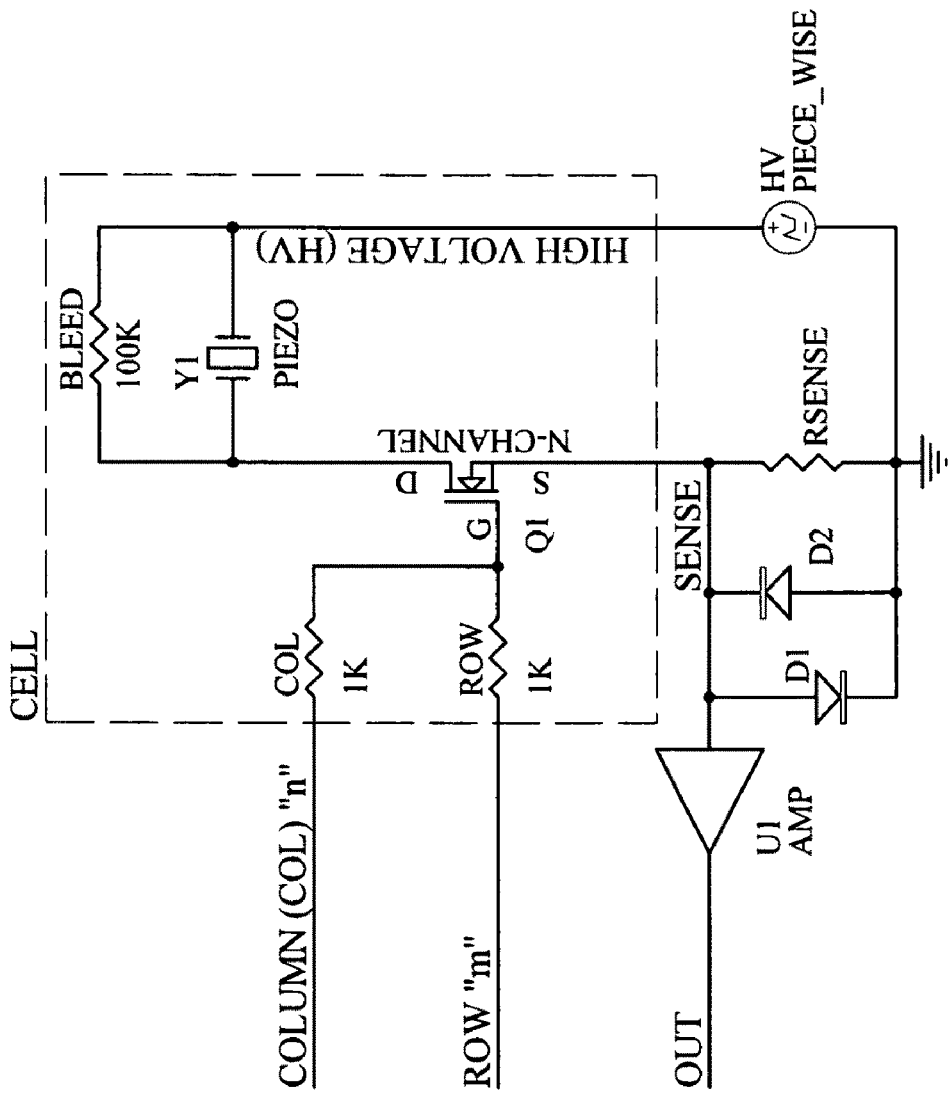
FIG. 4a shows an electronic schematic of a single cell of the array structure with the switch, addressing and piezoelectric material elements. The output of the cell is also shown connected to the preamplifier element that is used to combine the signals from one or more cells in the array.

Each individual cell electrode is connected to the Faraday cage by a high resistance bleeder resistor and can be connected through a low impedance to the reference potential by a switch as shown in FIG. 4*a*. When the electrode switches are off and a positive high voltage is applied to the Faraday cage, the potentials of the Faraday cage and the electrodes both rise to the high voltage. The material inside the Faraday cage is elevated to the high voltage value without a significant acoustic pulse being generated by the piezoelectric material. This assumes of course, that the high voltage is applied slowly enough such that the cell electrodes have time to track the increasing voltage.

Briefly, the present invention is directed to 1*a* method for ultrasonic non-destructive measurement of a work piece which can have a non-planar shape comprising: associating an array of excitable electrodes with a flexible layer of piezoelectric material and a unified electrode; maintaining the electrodes and the piezoelectric material at a common voltage, the common voltage being different than the reference voltage; during nondestructive measurement of a work piece, selected array electrodes are pulled to the reference potential; and receiving signals from the selected array electrodes. It is noted that, in the form of the invention disclosed, the step of maintaining the electrodes and the piezoelectric material at a common voltage includes enclosing the electrodes and the piezoelectric material in a Faraday cage structure, and the method can also include a step of electrically insulating the array electrodes from the Faraday cage structure.

When the switch is turned off, the response time of each cell returning to the high voltage level that is applied, or its "charge up" time, is determined primarily by the stray capacitance to the reference, the stray capacitance to the Faraday Cage structure and the resistance of the bleeder. Since these values can be controlled to a large extent through proper design and component selection, the charge up response time of individual cells can be suitably controlled.

Conversely, the discharge time of each cell is primarily determined by the stray capacitances in combination with the switch impedance and signal sensing resistance at the input to the preamplifier. These impedances are very low compared with the bleeder resistance, so upon switch activation, the voltage on the cell electrode changes rapidly. This rapid change in voltage induces a corresponding rapid change in the electric field between the Faraday Cage and the cell electrode. Some of this field permeates the piezoelectric material and the rapid field change generates an acoustic pulse.

This capability of each cell to generate its own excitation pulse as an effect produced by rapidly enabling the switch associated with the cell provides an important simplification to the overall system design. There is a significant reduction in cable and drive circuit complexity since this cell selection addressing (enabling) and excitation pulse generation scheme uses relatively low amplitude signals, compared to routing carefully controlled excitation pulses to each element. It should also be noted that due to the high "gain" associated with a switch actuating, relative low slew rate control signals that are easy to generate and route can result in much higher slew rates at the switching terminals. Also, since there is no dedicated excitation pulse circuitry or pulse transmission cabling, the physical size and cable handling problems are reduced.

Figure 3E:
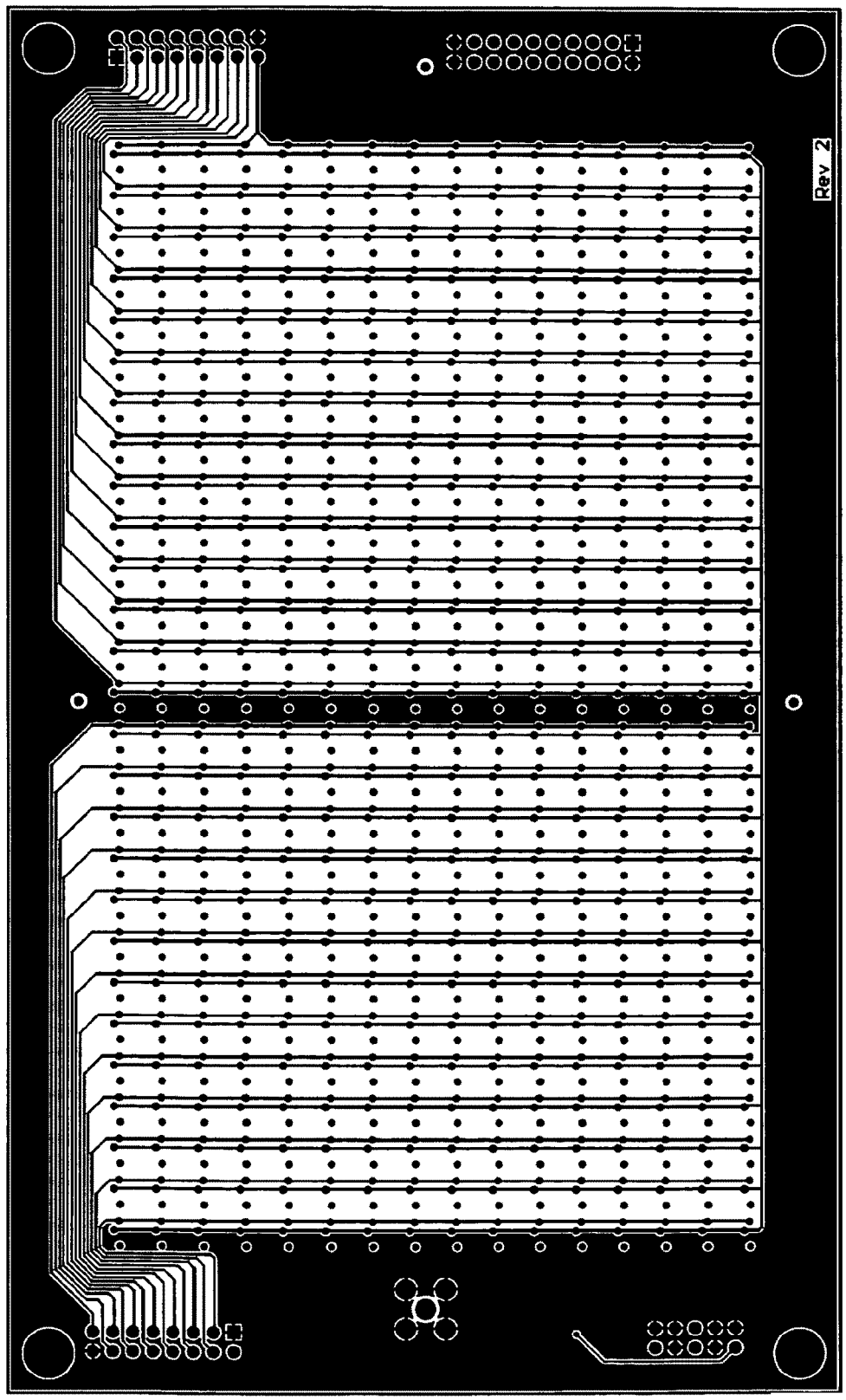
FIG. 3e shows a typical interconnection layer of the laminated structure. There may be none, one or more of these interconnection layers that can be configured to carry control, address and other measurement signals.
Figure 3F:
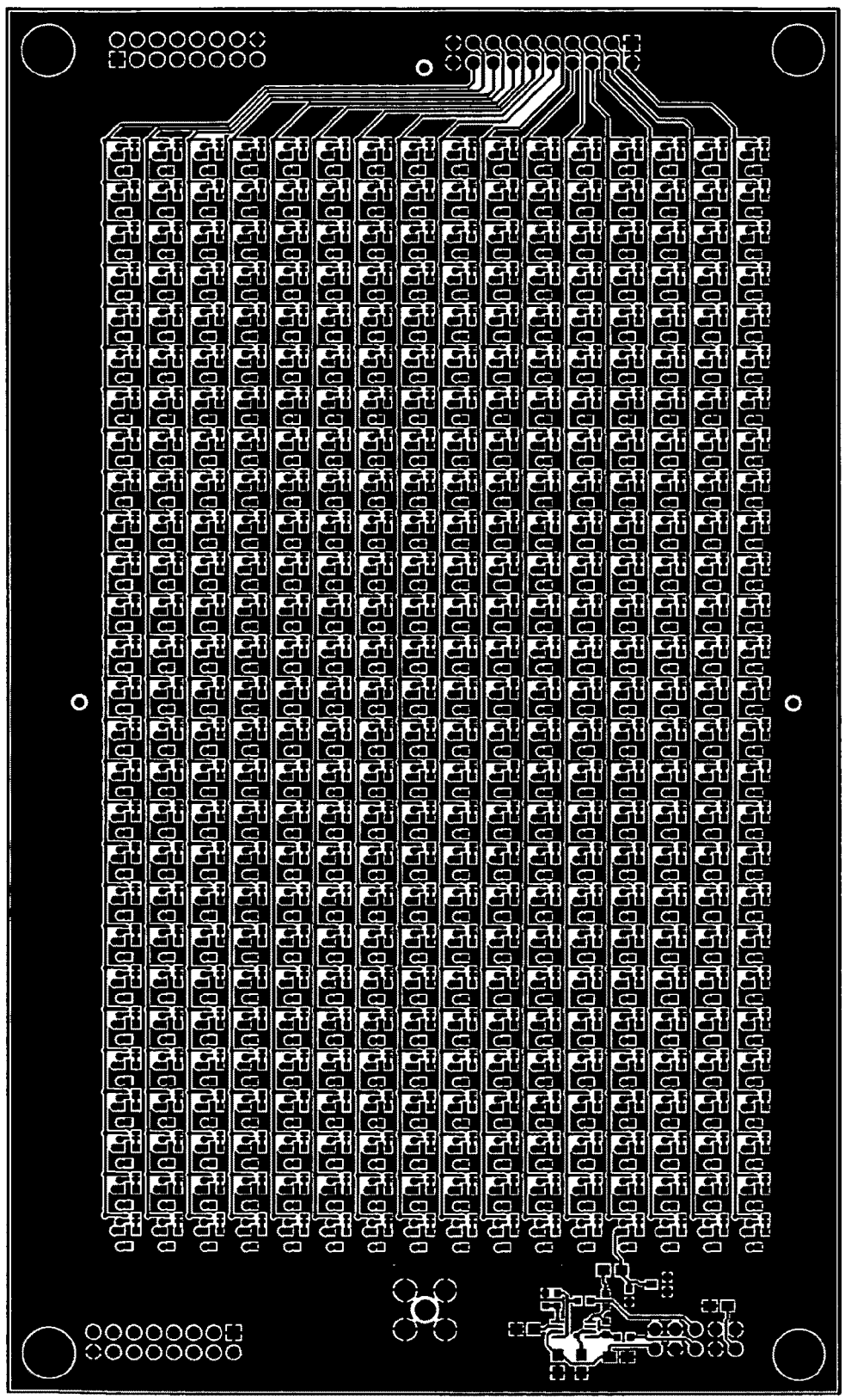
FIG. 3f shows a typical top layer of the laminated structure where the switches and supporting electronics may be mounted using standard circuit assembly techniques.

The remaining layers in the assembly are used to interconnect the various switching elements and support circuitry and to route signals to the preamplifier system. The electronic components are mounted on one side of the structure so that the opposite side can remain relatively smooth, such that a good bond can be effected to the piezoelectric material. Sample artwork for these layers is shown in FIGS. 3*e* and 3*f*.

Although only four layers are shown in this embodiment, more complex geometrical cell arrangements may require additional layers in the layup to make the required interconnections between components. As well, different materials of construction may necessitate adding layers to accommodate practical construction issues. Further, operation in extremely high electrical noise environments or adjacent to high voltage structures may require that additional shielding or insulating layers be added to this basic layout. No limitation of this invention based on a four layer construction should be taken by this discussion as the presently described embodiment is included for illustration purposes of the basic features of the invention.

Figure 4B:
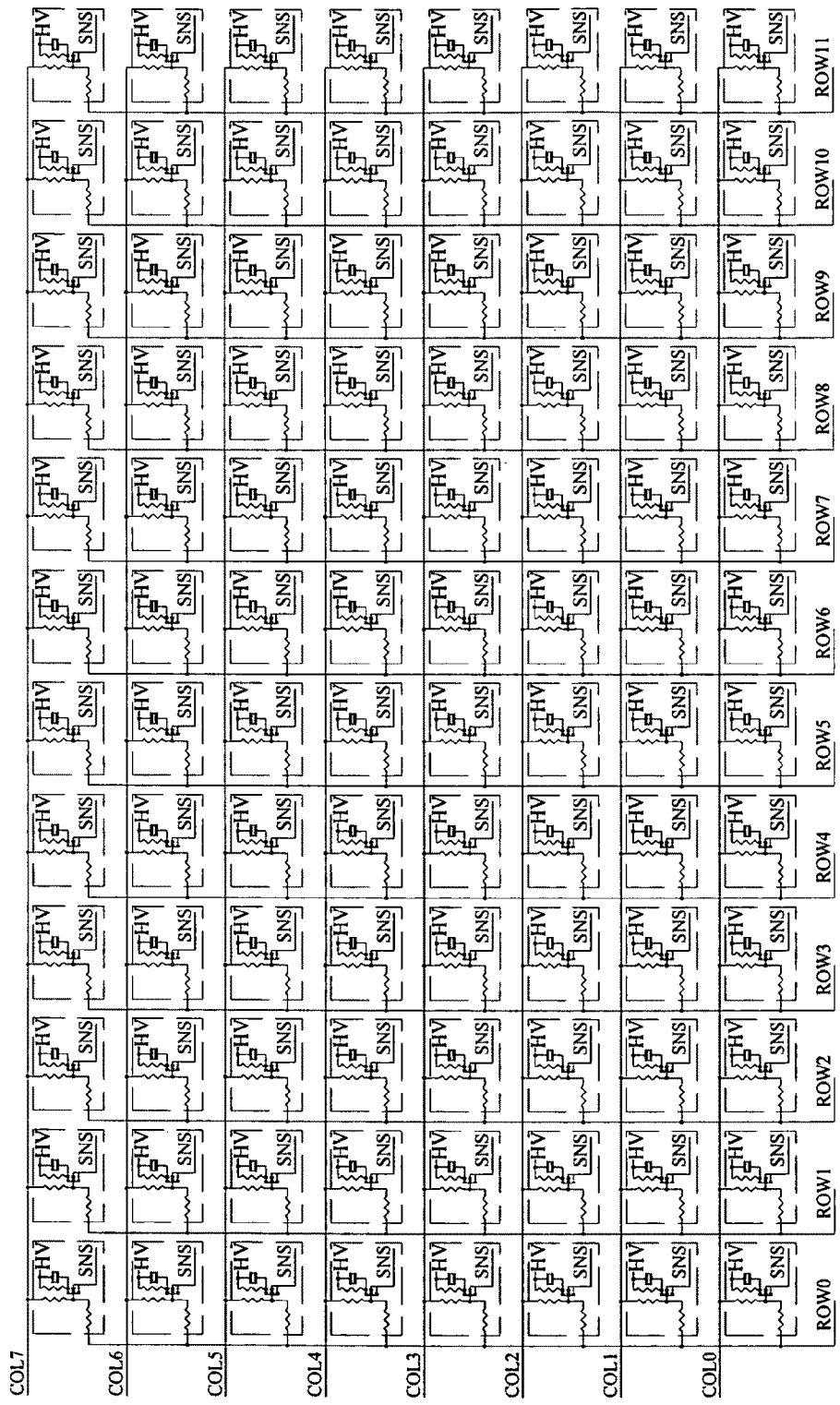
FIG. 4b shows a possible electronic circuit that incorporates an addressable array of cells configured as in FIGS. 3a and 3b.

FIG. 4*b* shows a more elaborate version of the switching and addressing circuits, with the many cells arranged in an array. In this configuration, the addressing of individual elements is performed using a rectangular row and column arrangement. For other geometries, other addressing methods could be used. For example, an array arrangement based on a sectioned circular array (radially segmented "pie" shapes) could use a sector and cylinder address routing scheme.

Note that each switching element has a nominal threshold where it is in the "ON" state and another threshold where it is in the "OFF" state. In practice, there is a small region between these two thresholds where the switch is in an intermediate impedance state, sometimes referred to as the "linear" region. The two thresholds often have nearly the same value, which is typically higher or lower than the local reference potential level, but in any case is known ahead of time by the system designers. Also, certain switches may have normally open or normally closed senses, may activate based on the applied current or voltage, or may have a region of hysteresis. Suitable switches can be found as MOSFET, Bipolar, J-FET and other transistors known in the art. In principle, all of these can be accommodated in this invention and each may provide certain benefits in certain applications. No limitation of the invention based upon the particular type or character of the switching element or particular method of activation is implied in this discussion.

For illumination of the salient aspects of this invention, the example of N-Channel MOSFET transistors has been selected as a preferred embodiment for the switch elements. These switch transistors are available in many configurations, but typically have a gate turn on (or switching) threshold in the range of 1 to 4 Volts. With the gate held below 1 V, the switch is effectively open or "OFF". With the gate held above 4 V, the switch is effectively closed or "ON". When in the ON state, these switches also have approximately the same impedance in both the forward and reverse current flow directions for small signals such as those produced in the piezoelectric material by the return echoes.

In the circuit shown in FIG. 4a, these states may be selected by applying similar or complementary amplitude signals to the ROW and COLUMN inputs. If the ROW and COLUMN inputs are each set at +10V for example, then the switch gate is held well above 4V and the switch is ON. If either the ROW or COLUMN input is set to −10V, with the other still at +10V, then the switch gate will be below 1V and the switch will be OFF. If both ROW and COLUMN are at −10V then the switch will also be OFF.

In the more elaborate, but more useful case shown in FIG. 4b, this ROW and COLUMN concept is extended to a true array. In this situation, the ROW "m" and COLUMN "n" lines are driven to appropriate levels to activate or deactivate various switches at various locations and times. The "m" and "n" terms are paired address coordinates of individual cells in a rectangular array. Note that in the case shown using N-Channel MOSFET transistors as the switches, the voltages driven onto each line may preferably operate from complementary voltages so that if either the ROW or COLUMN is driven to the negative sense, the switch is "OFF". This is effectively a logical AND function implemented in the analogue domain. Other variations using current sources and sinks, or implementing NAND, NOR or OR logic are also possible, depending upon the type of switch selected and the sense of the addressing signals.

This discussion also makes more clear the option of using the linear operating region to activate some switches without producing a corresponding acoustic pulse, assuming activation occurs when high voltage is otherwise established within the Faraday cage. If the appropriate ROW and COLUMN lines are allowed to slew slowly, the combined voltage at the particular MOSFET gate will also slew slowly, which in turn will soften the hard switching action of the MOSFET by allowing it to operate temporarily in the linear region where the switch impedance is not low.

A preamplifier is incorporated into the device. A preamplifier is in close proximity to the piezoelectric elements and is connected to a buss passing by each of the switches. All switches that are active either as transmitters or receivers or that are operating in both modes at any given instant potentially supply a signal to the buss. The preamplifier input is organized to optimize the input signal amplitude, response shape and matching.

Resistor RSENSE is included to provide a low impedance path to the reference potential from the signal return buss. A reverse-parallel connected diode pair, formed by D1 and D2 in FIG. 4a, is provided across RSENSE, effectively at the preamplifier input as an amplitude limiter, or clamp, to protect U1 against high voltages that might be present during or immediately following cell excitation. When a particular group of cells are used as transmitters, high level signals are produced by the rapid discharge of the cell capacitance which are voltage clamped by the reverse-parallel diode pair. During this period of high signal amplitude, the impedance introduced in the transmit circuit is determined by the impedance of the associated cell switches (the MOSFETs) in conjunction with the dynamic impedance of one or both the diodes in pair when they are driven into conduction. The net result is that for the transmit pulses, there is a relatively low generator impedance which provides for strong transmit signals.

For signal reception, the apparent impedance for signals generated by returning acoustic signals (that occur outside of the transmit pulse generation interval) is approximately RSENSE in series with the associated MOSFET ON resistances if the MOSFET is ON. In this situation, the signals are comparatively low in amplitude and do not force the diode clamp circuit into conduction, so the preamplifier impedance is higher. The effective load impedance for return signals is affected somewhat by stray loading by other cells through their MOSFET's, leakage capacitances and the like, but these are typically small effects compared to the load introduced by RSENSE.

This invention also contemplates that the piezoelectric element coupling to the preamplifier may include other passive or active tuning elements to tailor various impedance characteristics to optimize signal amplitudes and responses on an application-to-application basis.

When the piezoelectric element is acting as a receiver, the small signals generated do not cause the diode pair to conduct and therefore the impedance of the preamplifier is essentially RSENSE fed from a generator formed from the piezoelectric material associated with the active cells and the ON resistance of the MOSFET's. The preamplifier can also be used to isolate the low level signals from the impedance of return transmission lines and possible downstream processing circuits.

The principles of the present invention can also be achieved by performing signal processing close to the array to enhance the signal to noise ratio by preventing noise pickup and other signal degradation caused by long cable runs.

The principles of the present invention can also be achieved by converting the received signals to a representative digital form immediately after the preamplifier stage. The digital representation can be conveyed via a suitable connection such as a transmission line system to a remote display and processing assembly.

The principles of the present invention can also be achieved by including control and processing circuitry on the laminar array transducer that can emulate the interface to a conventional phased array transducer assembly to allow "drop in" replacement of the conventional transducer assembly in a conventional phased array test system. As an example, the conventional transducer might be a linear array with a one-dimensional scan and a position encoder to monitor the physical position of the array in the direction perpendicular to the scan plane. The control and processing electronics for the laminar array transducer can emulate the linear array and encoder. Control and excitation signals from the test system could be received by the laminar transducer control and processing electronics and the appropriate HV power and switch gating signals derived and sent to the Faraday layers and the appropriate cells. The received signals could be sent back to the test system along with signals emulating the encoder to indicate the position of the linear array that was excited.

A conceptual drawing of the electric field present in the cell region, and more importantly in the piezoelectric material, is shown in FIG. 3b. This field is introduced when the switching element shown in FIG. 4a is activated when it is addressed by suitable control elements.

If the switching element shown in 4a is activated relatively quickly, the resulting rapid change in the electric field in the piezoelectric material produces a corresponding acoustic pulse.

Figure 5A:
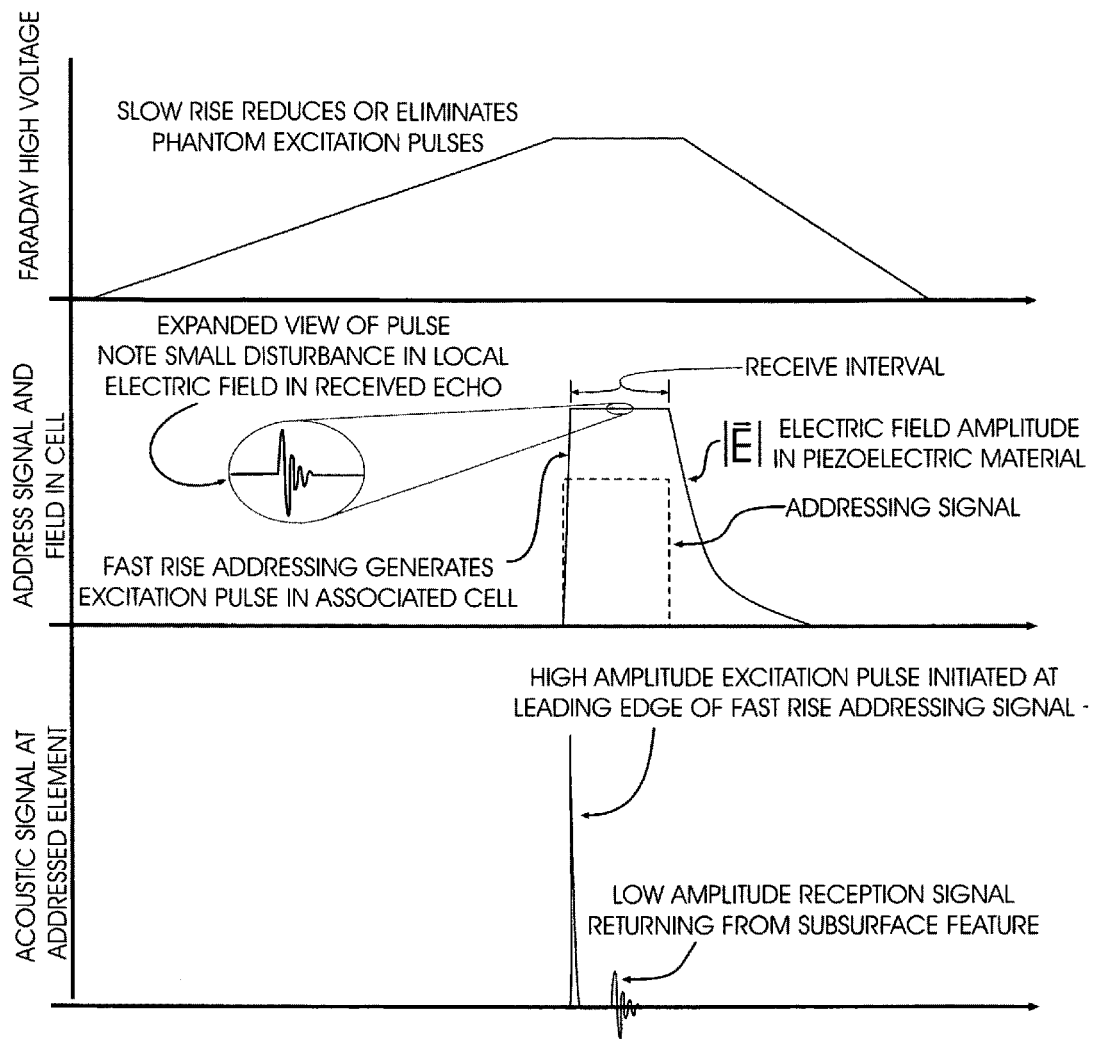
FIG. 5a shows a conceptual signal timing diagram corresponding to an individual cell being used in both transmit and receive mode. The relative timing and pulse shapes for HV power provisioning, switch gating signal, piezoelectric material electric field and acoustic signals are shown.

A timing and amplitude scenario for the above is shown in FIG. 5a, wherein a cell is used in both transmit and receive mode. The high voltage is ramped up to a level consistent with producing a useful acoustic pulse. Next, the switching element is activated quickly and then left in a conducting or ON state. The electric field induced in the piezoelectric material rapidly changes, resulting in an acoustic transmit pulse which travels out of the assembly and into the material being interrogated. After a period, a return echo impinges on the face of the assembly which in turn causes the piezoelectric material to generate a small receive signal that is coupled into the preamplifier assembly through RSENSE. At a later time, the switch is deactivated and the cell electrode floats back to the current voltage of the Faraday cage (which may or may not still have high voltage applied) by the action of the bleeder resistance.

Conversely, if the switching element in 4a is activated relatively slowly (that is, where the switch is controlled so that it passes through a "linear control" region over a sufficiently long period) then the smooth and slow transition of the switch impedance from an open state to a closed state provides a slowly changing electric field. The slow change in the electric field produces a negligible amount of acoustic energy. This is an important feature, since cells can be activated without producing acoustic pulses, which allows the array to preconfigure certain cells to act as receive only elements.

Figure 5B:
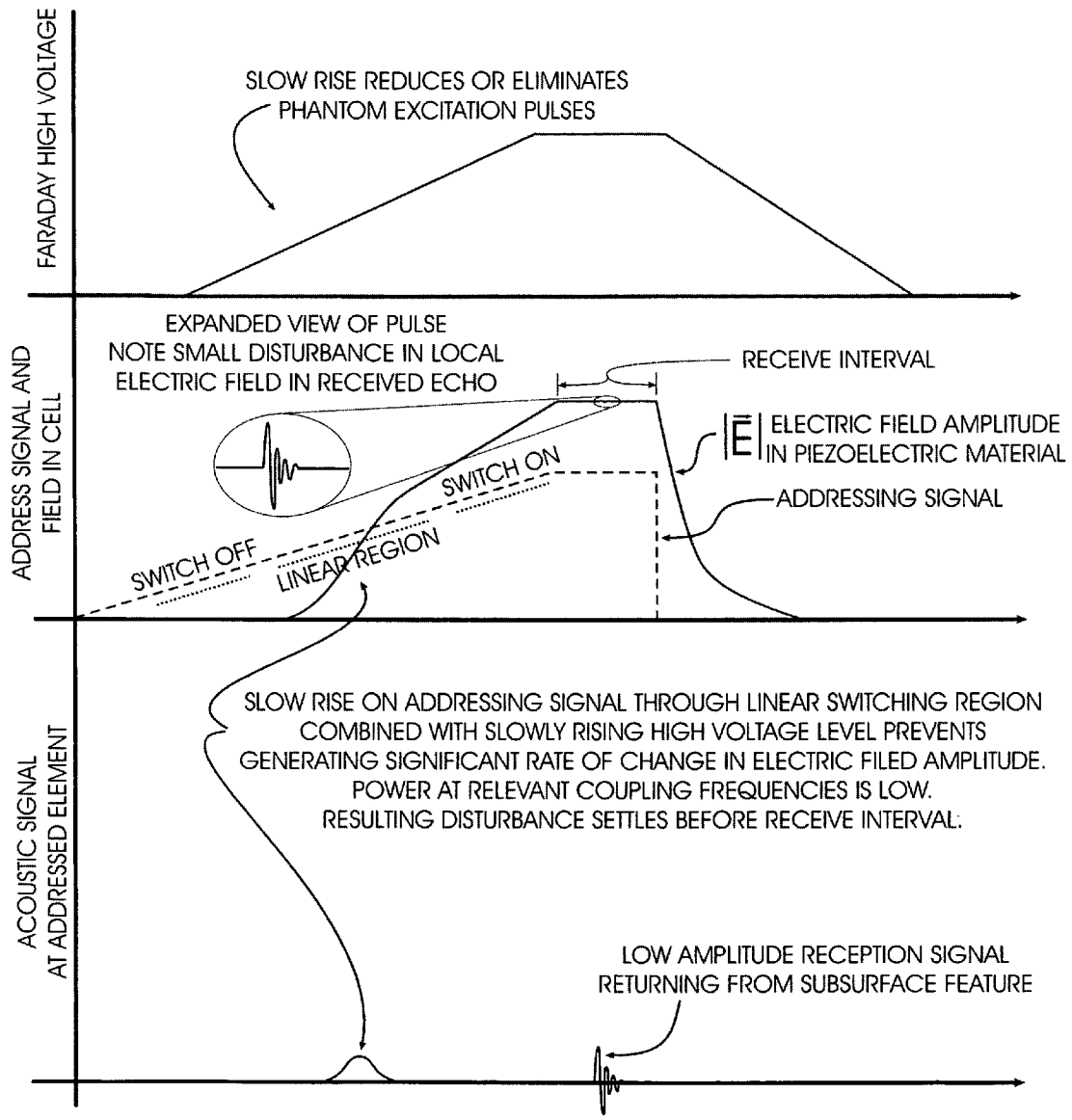
FIG. 5b shows a conceptual signal timing diagram corresponding to an individual cell being used as a receiver only. The relative timing and pulse shapes for HV power provisioning, switch gating signal, piezoelectric material electric field and acoustic signals are shown.

A timing and amplitude scenario for the slow switch activation is shown in FIG. 5b, wherein a particular cell is used only as receive mode. The Faraday high voltage and addressing for cells intended for receive only use are applied relatively slowly and allowed to settle. The "receive only" cells' switching elements are left in a conducting state. The electric field induced in the "receive only" cells piezoelectric material does not change rapidly and thus very little acoustic energy is produced within a frequency range that can subsequently couple back into the piezoelectric material if it happens to reflect back into the array. After an appropriate settling period, another cell is activated in transmit mode and the echoes produced from the transmitted pulse impinge on the face of the assembly. Any cells that have their switching elements active (that is the ones configured to receive) have the echo signals produced in the piezoelectric material coupled into the preamplifier assembly through RSENSE. At a later time, the switch elements can be deactivated and the various cell electrodes can slowly return to the Faraday cage voltage level through the action of the bleeder resistance. Another variation on this scheme is to simply deactivate the high voltage after a configure-transmit-receive sequence and allow the cells to return to a neutral state. In any case, the downstream received signal processing system can inhibit any pulse received during the high voltage shutdown or reconfiguration from being processed since they occur outside of the valid pulse reception time window.

Figure 5C:
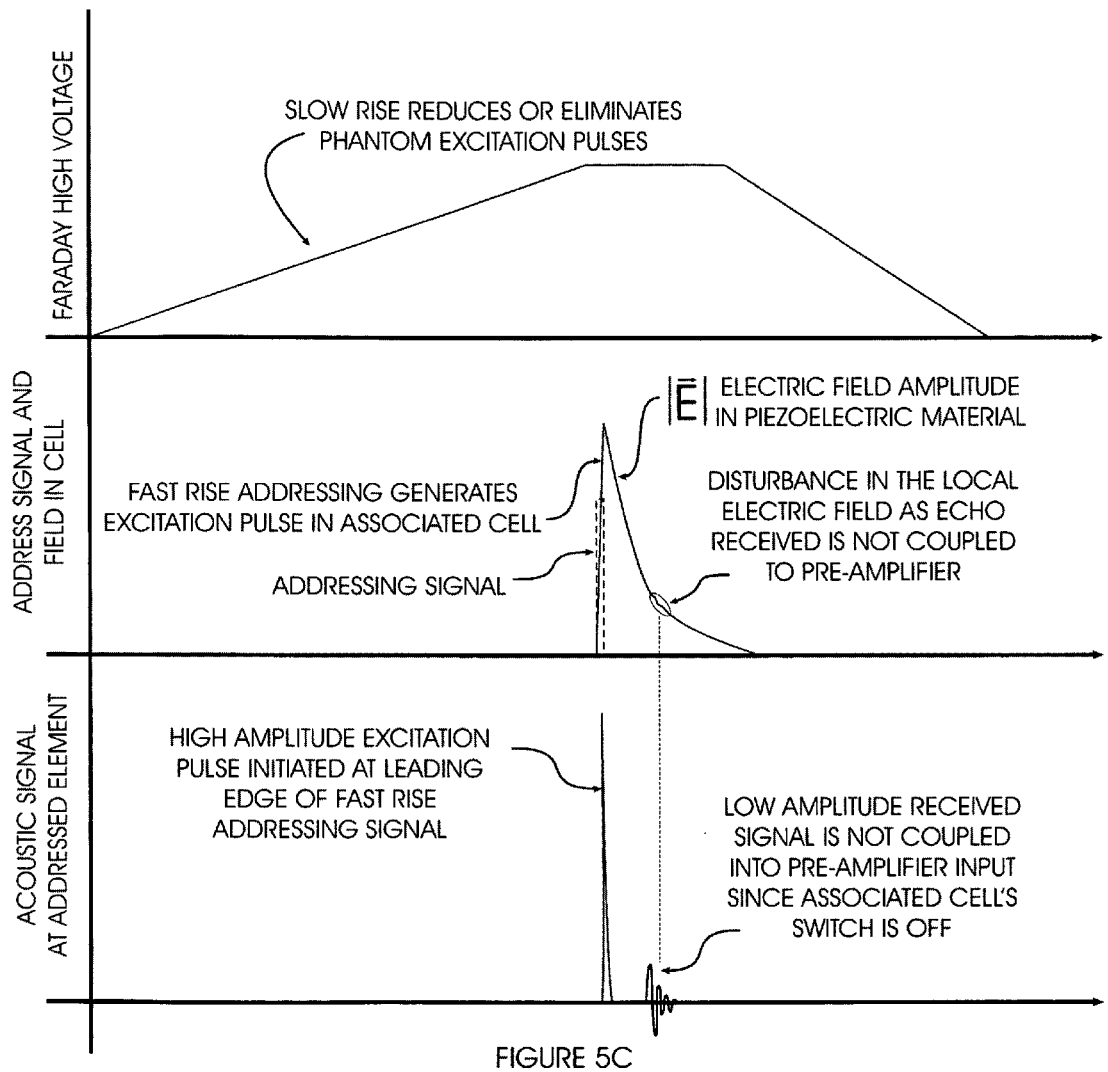
FIG. 5c shows a conceptual signal timing diagram corresponding to an individual cell being used as a transmitter only. The relative timing and pulse shapes for HV power provisioning, switch gating signal, piezoelectric material electric field and acoustic signals are shown.

Another possible mode of individual element operation is to use a cell as a transmitter only such that it does not contribute to the received signal amplitude in a significant way. A conceptual timing figure is shown in FIG. 5c. This figure is similar to FIG. 5a, but differs in that the MOSFET is immediately turned off after the initial pulse generation period so that there is no receive period following. As a result, returning acoustic signals are substantially prevented from coupling into the signal return buss and subsequently the preamplifier. Operation in this mode allows a cell to transmit, but be comparatively blind to returning signals so that the signal on the preamplifier input is primarily composed of return signals from other cells configured as receivers.

The "receive only" capability can also be achieved by activating the switch element prior to the application of the high voltage. In this case no voltage capable of creating an electric field is present at the time of switching, so switching on the element associated with a particular cell has no effect. Subsequently, if the rate of rise in the high voltage is restricted, then the electric field in the already activated cell can be controlled so that it does not increase quickly enough to produce a significant acoustic pulse. Other cells in the array that were not activated prior to the application of high voltage may still be used to produce transmit pulses.

Note also that the particular shape of the various waveforms after the acoustic pulse generation and reception period is not critical, as the data acquisition process is complete for this cycle. However, care should be taken to arrange the various pulse timings and shapes so as to minimize stray or phantom electric and acoustic signals into the underlying materials or into the piezoelectric or electronic circuits which could affect subsequent measurement cycles. Allowing a suitable dwell time after the generation and reception of a particular measurement sequence and before the next cycle can be effective for this purpose, although more complex position and signal interleaving scenarios are also possible.

The above process is appropriate for generating ultrasound pulses to interrogate the test material on a path orthogonal to the surface of the array at the point where the ultrasound pulse is generated. However, this invention is also capable of generating ultrasound pulses that travel at an angle to the surface of the array. This can be achieved by using phased pulse control wherein a series of cells and elements are triggered in a controlled, close succession such that constructive and destructive interference in the resulting ultrasound waves from each element causes the net wave propagation to operate in direction at an angle to the originating surface. Using this method of excitation and reception, side looking inspections can be performed.

Many variations in the relative timing and shapes of the various provisioning and addressing signals on the array are possible, with only a few shown herein for illustration of the general capabilities of this invention. However, since this invention can be configured to take advantage of these various timing, switching and geometrical cell shape and arrangement combinations, a range of devices and operating modes is possible including, but not limited to:

direct excitation and reception by one or more adjacent cells, such that the acoustic waves travel to and from underlying structures essentially orthogonal to the face of the piezoelectric material.

excitation by one or more cells and reception by another group of one or more cells at a different array location, such that reflections from underlying structures reflecting at an angle to the incoming acoustic wave direction can be detected.

time phased excitation and reception of various cell groupings in the array to produce and receive acoustic signals propagating at an angle to the face of the piezoelectric material.

producing acoustic beams normal to the emitting surface but with various section profiles or shapes, by strobing appropriately placed cells or groups of cells.

Figure 6:
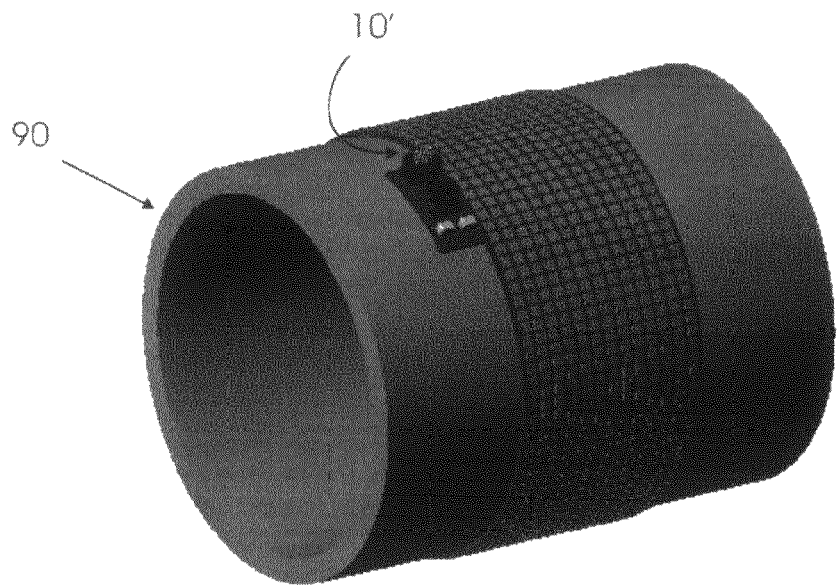
FIG. 6 shows the sample configuration of FIGS. 3 and 4 mounted on a typical section of pipe positioned over an area of interest (for instance a weld zone).

FIG. 6 shows unit 10' which is one embodiment of the invention mounted on a typical portion of piping 90, for instance at the location of a weld between two sections of pipe.

Figure 7:
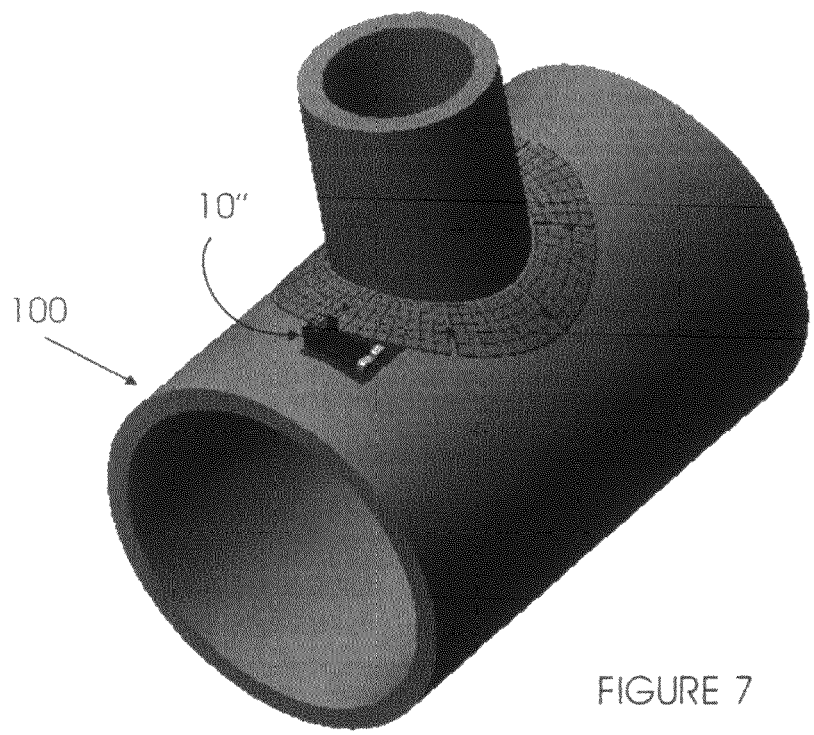
FIG. 7 shows a configuration of the invention wherein the array is provided in a physical shape suitable for surrounding the "Tee" intersection point of two pipes.

FIG. 7 shows unit 10" which is another embodiment of the invention mounted at the intersection of a "Tee" 100. As can be understood from the teaching of the disclosure of these figures, the work pieces 90 and 100 are non-planar in configuration so the flexible nature of the units allows them to be configured to be accommodated on such non-planar shapes. In these applications, the device is quasi-permanently mounted so that periodic inspections of the pipe integrity can be performed to monitor wear and flaw propagation, especially useful at weld points or at flow transitions. Because of the laminar construction of the units, the device can be made thin and flexible so that it is able to easily conform to curved surfaces. In the case of the Tee shown in FIG. 7 the option of providing the arrays in other outline shapes is demonstrated, to allow forming the device over or around other complex shapes such as Tee's, "Wye's", elbows, diameter transitions, nozzles, flanges, pressure vessels and the like.

A further advantage that this device has is that it reduces the need for operator interaction and setup associated with AUT scanning systems since there is no physical movement required after installation to position the array over a region of interest. This is significantly different from what occurs with automatic scanning systems that depend on complex mechanics or robotics to position (or reposition) a small ultrasound probe over each region of interest. Reduced operator interaction has several advantages, including reducing risks to the operator when testing in dangerous locations. With AUT, the probe may be of a single or multiple element design, possibly a linear array, which is slowly transited over the surface of the test sample while the probe performs measurements. The measurements are typically compiled to create a map or picture of the test sample.

In contrast, in accordance with the principles of this invention, the surface of the test sample is covered by the array and interrogation of the sample from different points and angles is performed by selecting different combinations of transmitter, transmit/receive and receiver elements without moving the array. The device may be permanently fixed in position to allow repeated, consistent measurements with fixed viewing geometries over large surface areas. This allows periodic inspections to be performed to accurately detect slowly changing material dimensions and conditions.

Permanent fixture allows continuous inspection that facilitates the detection of rapid changes in the material under inspection.

Permanent fixture also allows repeated measurements of the underlying material without introducing additional positional errors caused by physically moving the ultrasound transducer between or during measurement sessions.

The device can also provide measurement data that effectively looks into the material being interrogated from a variety of locations and angles, especially if phased array techniques are employed to control the relative timing of appropriately selected cells.

In conjunction with or used alternately to phased array techniques, various cells can be configured as transmitters or receivers. With physically separated transmitters and receivers, the acoustic excitation pulses generated in one location can propagate to cells positioned elsewhere in the array, allowing materials to be interrogated with laterally propagating acoustic waves.

A further related advantage is the comparatively high spatial sampling rate that is provided, which helps minimize "missed" regions in the test volume. This is a problem encountered when using manually or automatically positioned transducers since they depend on accurate placement or placement repeatability. Yet a further advantage over these robotic systems is that the coupling layer used to mate the ultrasound system to the sample is not altered between measurements, which tends to eliminate variations in the transmitted and return signals caused by changes in the couplant layer geometry.

Both of the above two factors combine to further improve the consistency from measurement to measurement compared to AUT systems, and thus provide the potential of detecting changes in test samples and materials earlier or to finer detail. This invention allows the generation and reception of ultrasound signals from a piezoelectric sheet effectively divided into many smaller cells, wherein the position and signal timing of the individual cells can be controlled by an automated process that simulates the physical movement of a single element or linear array.

The preceding discussion demonstrates the feasibility and usefulness of this invention for many applications not currently served by conventional technologies.

It is understood that while certain forms of the present invention have been illustrated and described herein, it is not to be limited to the specific forms or arrangements of parts described and shown

What is claimed is:

1. A device for ultrasonic measurement applications comprising:
    an ultrasonic transducer unit which includes a layer of piezoelectric material sandwiched between and connected to a unified electrode and a plurality of excitable electrodes; and
    a Faraday structure enclosing the ultrasonic transducer unit, wherein the unified electrode is part of the Faraday structure.

2. The device defined in claim 1 further including a plurality of bonded layers of insulators and conductors and the piezoelectric material is bonded to the bonded layers.

3. The device as defined in claim 2 wherein the plurality of bonded, layers of insulators and conductors are printed circuit material.

4. The device defined in claim 1 wherein each excitable electrode is connected to the Faraday structure by a bleeder resistor.

5. The device defined in claim 4 wherein each of the plurality of excitable electrodes is connected to a common signal summing point that is held close to a reference potential by a switch that is under programmable control.

6. The device defined in claim 1 further including circuitry associated with each of the plurality of excitable electrodes which is adapted to configure the area of the transducer associated with the excitable electrode as a transmitter and as a receiver as desired.

7. The device defined in claim 1 wherein the transducer unit is flexible.

8. A device for ultrasonic material testing comprising:
    an ultrasonic transducer unit which includes a layer of piezoelectric material sandwiched between and connected to a unified electrode and a plurality of excitable electrodes; and
    a Faraday structure enclosing the ultrasonic transducer unit, wherein the unified electrode is part of the Faraday structure.

9. A device for nondestructive ultrasonic material testing comprising:
    an ultrasonic transducer unit which includes a layer of piezoelectric material sandwiched between and connected to a unified electrode and a plurality of excitable electrodes; and
    a Faraday structure enclosing the ultrasonic transducer unit, wherein the unified electrode is part of the Faraday structure.

10. A device for measuring and testing, comprising:
    an ultrasonic transducer unit which includes a layer of piezoelectric material sandwiched between and connected to a unified electrode and a plurality of excitable electrodes; and a Faraday structure enclosing the ultrasonic transducer unit, wherein each excitable electrode is connected to the Faraday structure by a bleeder resistor.

11. The device defined in claim 10, wherein the device is configured to perform measuring and testing operations selected from the group consisting of ultrasonic measurements, ultrasonic testing and non-destructive ultrasonic testing.

12. The device defined in claim 10 further including a plurality of bonded layers of insulators and conductors, wherein the piezoelectric material is bonded to the bonded layers.

13. The device as defined in claim 12 wherein the plurality of bonded layers of insulators and conductors are printed circuit material.

14. The device defined in claim 10 wherein each of the plurality of excitable electrodes is connected to a common signal summing point that is held close to a reference potential by a switch that is under programmable control.

15. The device defined in claim 10, further including circuitry associated with each of the plurality of excitable electrodes which is adapted to configure the area of the transducer associated with each of the plurality of excitable electrodes as a transmitter and as a receiver as desired.

16. The device defined in claim 10, wherein the ultrasonic transducer unit is flexible.

17. A device for measuring and testing, comprising:
   an ultrasonic transducer unit which includes a layer of piezoelectric material sandwiched between and connected to a unified electrode and a plurality of excitable electrodes;
   a Faraday structure enclosing the ultrasonic transducer unit; and
   a plurality of bonded layers of insulators and conductors, wherein the piezoelectric material is bonded to the bonded layers and wherein the plurality of bonded layers of insulators and conductors are printed circuit material.

18. A device for measuring and testing, comprising:
   an ultrasonic transducer unit which includes a layer of piezoelectric material sandwiched between and connected to a unified electrode and a plurality of excitable electrodes, wherein the ultrasonic transducer unit is flexible; and
   a Faraday structure enclosing the ultrasonic transducer unit.

19. A device for use in ultrasonic material testing, comprising:
   an array of excitable electrodes associated with a piezoelectric material;
   means for maintaining the electrodes and the piezoelectric material at a common voltage, the common voltage being different than a reference potential; and
   control circuitry which, during ultrasonic material testing, pulls to the reference potential selected electrodes and receives signals from the selected electrodes,
   wherein the array of excitable electrodes, the piezoelectric material and the means for maintaining the electrodes and the piezoelectric material at a common voltage are configured to form a flexible unit which is adapted to flex into a non-planar shape.

20. A device for use in ultrasonic testing, comprising:
   a first electrode which is a front electrode when in use in ultrasonic material testing;
   a layer of piezoelectric material having a first surface which is located adjacent to the first electrode, and a second surface;
   a plurality of excitable electrodes mounted on the second surface of the layer of piezoelectric material;
   a layer of insulating material located adjacent to the plurality of excitable electrodes so the electrodes are located between the insulating material and the piezoelectric material;
   a second electrode which is a back electrode when in use and which is located adjacent to the layer of insulating material;
   an electrical connection electrically connecting the front electrode to the back electrode in a manner such that the front electrode and the back electrode and the connection connecting the front and back electrodes define a Faraday structure, the Faraday structure enclosing the piezoelectric material and the excitable electrodes and the layer of insulating material whereby the piezoelectric material and the excitable electrodes and the layer of insulating material all can be maintained at a common voltage potential; and
   control circuitry electrically connected to the plurality of excitable electrodes and configured to connect selected ones of the plurality of excitable electrodes to a reference potential to cause generation of an ultrasound pulse and to simultaneously enable receiving signals generated by the selected ones of the plurality of excitable electrodes, the control circuitry being located in close proximity to the piezoelectric material,
   wherein the first electrode, the layer of piezoelectric material, the plurality of excitable electrodes mounted on the second surface of the layer of piezoelectric material and the second electrode are configured and assembled as a thin, laminar, flexible assembly which can be formed into a non-planar shape.

* * * * *